US012647868B2

(12) United States Patent
Lei

(10) Patent No.: US 12,647,868 B2
(45) Date of Patent: Jun. 2, 2026

(54) NETWORK HANDOVER PROCESSING METHOD, NETWORK HANDOVER PROCESSING APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 313 days.

(21) Appl. No.: 18/350,802

(22) Filed: Jul. 12, 2023

(65) Prior Publication Data

US 2023/0354142 A1    Nov. 2, 2023

Related U.S. Application Data

(63) Continuation of application No. PCT/CN2022/128491, filed on Oct. 31, 2022.

(30) Foreign Application Priority Data

Dec. 31, 2021    (CN) .......................... 202111679451.9

(51) Int. Cl.
*H04W 36/38* (2009.01)
*H04W 28/08* (2023.01)
*H04W 36/24* (2009.01)
(52) U.S. Cl.
CPC ..... *H04W 36/385* (2013.01); *H04W 28/0992* (2020.05); *H04W 36/24* (2013.01)
(58) Field of Classification Search
CPC ........... H04W 36/385; H04W 28/0992; H04W 36/24; H04W 36/0069; H04W 36/0044;
(Continued)

(56) References Cited

U.S. PATENT DOCUMENTS

2010/0278140 A1 * 11/2010 Smith .................... H04J 3/0658
370/331
2013/0301617 A1 * 11/2013 Kuhn ................ H04W 36/0085
370/331
2021/0400146 A1 * 12/2021 Muñoz De La Torre Alonso .......
H04L 47/803

FOREIGN PATENT DOCUMENTS

CN          101322432 A      12/2008
CN          108347336 A       7/2018
(Continued)

OTHER PUBLICATIONS

International Search Report for PCT/CN2022/128491 dated Jan. 13, 2023.

(Continued)

*Primary Examiner* — Charles C Jiang
(74) *Attorney, Agent, or Firm* — Sughrue Mion, PLLC

(57) ABSTRACT

A network handover processing method includes receiving traffic stream feature information from an application side, the traffic stream feature information indicating features of service data packets transmitted between the application side and user equipment, generating, based on the traffic stream feature information, a handover policy, the handover policy being a policy to be followed during a handover of an access network entity connected to the user equipment, and transmitting the handover policy to a session management functional entity, so that the session management functional entity configures the handover policy for another network entity.

20 Claims, 7 Drawing Sheets

(58) Field of Classification Search
    CPC .. H04W 36/18; H04W 36/0005; H04W 36/08
    See application file for complete search history.

(56)                     References Cited

FOREIGN PATENT DOCUMENTS

| | | | | | | |
|---|---|---|---|---|---|---|
| CN | 109600759 | A | | 4/2019 | | |
| CN | 110383762 | A | | 10/2019 | | |
| CN | 112243199 | A | | 1/2021 | | |
| CN | 110769417 | B | * | 3/2021 | ............ | H04W 12/04 |
| CN | 113543165 | A | | 10/2021 | | |
| CN | 115669009 | A | * | 1/2023 | ............ | H04W 48/14 |

OTHER PUBLICATIONS

Written Opinion for PCT/CN2022/128491 dated Jan. 16, 2023.
Communication Issued Jan. 28, 2026 in Chinese Application No. 202111679451.9.

* cited by examiner

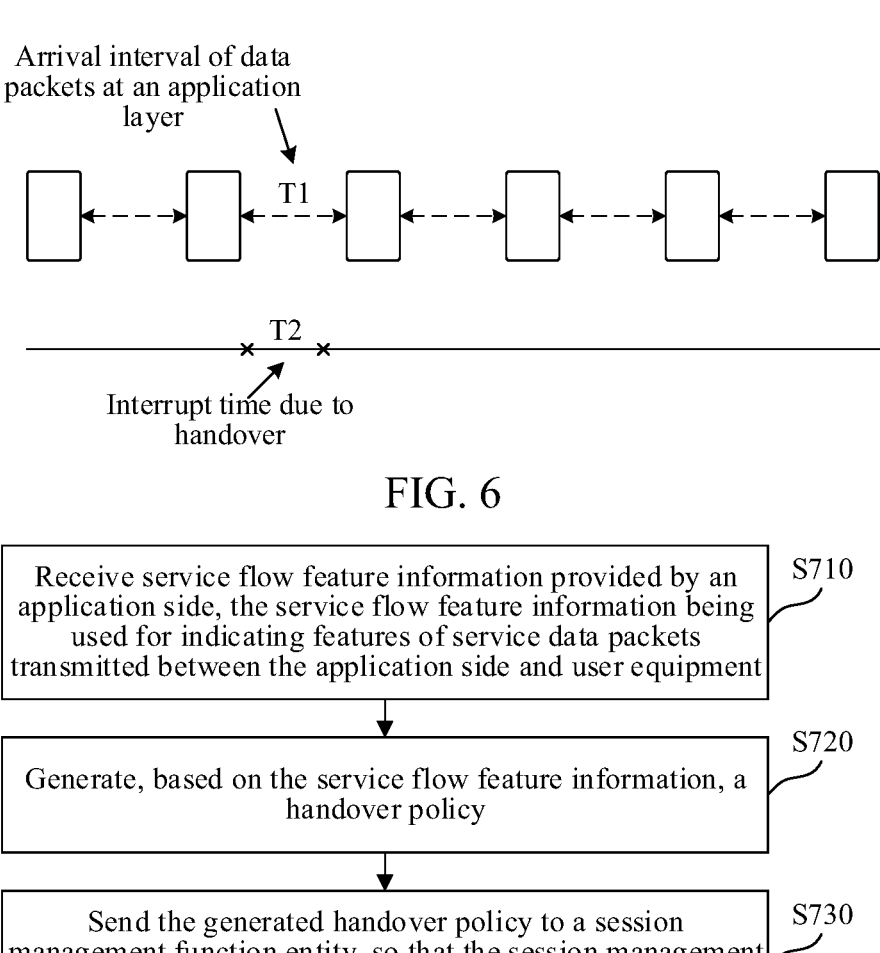

Arrival interval of data packets at an application layer

T1

T2

Interrupt time due to handover

FIG. 6

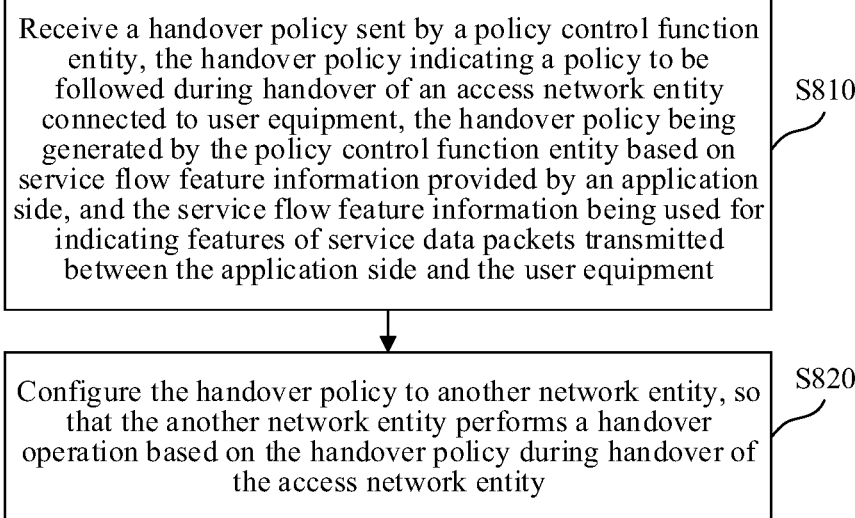

| S710 |
| --- |
| Receive service flow feature information provided by an application side, the service flow feature information being used for indicating features of service data packets transmitted between the application side and user equipment |

| S720 |
| --- |
| Generate, based on the service flow feature information, a handover policy |

| S730 |
| --- |
| Send the generated handover policy to a session management function entity, so that the session management function entity configures the handover policy to another network entity |

FIG. 7

| S810 |
| --- |
| Receive a handover policy sent by a policy control function entity, the handover policy indicating a policy to be followed during handover of an access network entity connected to user equipment, the handover policy being generated by the policy control function entity based on service flow feature information provided by an application side, and the service flow feature information being used for indicating features of service data packets transmitted between the application side and the user equipment |

| S820 |
| --- |
| Configure the handover policy to another network entity, so that the another network entity performs a handover operation based on the handover policy during handover of the access network entity |

NETWORK HANDOVER PROCESSING METHOD, NETWORK HANDOVER PROCESSING APPARATUS, COMPUTER-READABLE MEDIUM, AND ELECTRONIC DEVICE

CROSS-REFERENCE TO RELATED APPLICATIONS

This application is a continuation application of International Application No. PCT/CN2022/128491, filed on Oct. 31, 2022, which claims priority to Chinese Patent Application No. 202111679451.9 filed with the China National Intellectual Property Administration on Dec. 31, 2021, the disclosures of each of which being incorporated by reference herein in their entireties.

FIELD

The disclosure relates to the field of communication technologies, and in particular, to network handover processing technologies.

BACKGROUND

A 5G system has two networking modes: non-standalone (NSA) and standalone (SA). In both networking modes, a handover mechanism is introduced to avoid data loss when user equipment (UE) hands over connected access network equipment (e.g., a base station). To guarantee handover performance (for example, to reduce data transmission delay caused by handover), various handover mechanisms have been proposed in related arts, but these handover mechanisms generally have the problems of high costs and excessive network resources required.

SUMMARY

Embodiments of the disclosure provide a network handover processing method, a network handover processing apparatus, a computer-readable medium, and an electronic device, which can ensure that a handover policy matches actual traffic stream feature information to some extent, so as to avoid high handover costs and waste of network resources while ensuring handover performance.

Some embodiments provide a network handover processing method, performed by a policy control functional entity, the network handover processing method including: receiving traffic stream feature information from an application side, the traffic stream feature information indicating features of service data packets transmitted between the application side and user equipment; generating, based on the traffic stream feature information, a handover policy, the handover policy being a policy to be followed during a handover of an access network entity connected to the user equipment; and transmitting the handover policy to a session management functional entity, so that the session management functional entity configures the handover policy for another network entity Some embodiments provide a network handover processing apparatus, including: at least one memory configured to store program code; and at least one processor configured to read the program code and operate as instructed by the program code, the program code including: first receiving code configured to cause at least one of the at least one processor to receive traffic stream feature information from an application side, the traffic stream feature information indicating features of service data packets transmitted between the application side and user equipment; generating code configured to cause at least one of the at least one processor to generate, based on the traffic stream feature information, a handover policy, the handover policy being a policy to be followed during a handover of an access network entity connected to the user equipment; and transmitting code configured to cause at least one of the at least one processor to transmit the handover policy to a session management functional entity, so that the session management functional entity configures the handover policy for another network entity.

Some embodiments provide a non-volatile computer-readable storage medium storing computer code which, when executed by at least one processor, causes the at least one processor to at least: receive traffic stream feature information from an application side, the traffic stream feature information indicating features of service data packets transmitted between the application side and user equipment; generate, based on the traffic stream feature information, a handover policy, the handover policy being a policy to be followed during a handover of an access network entity connected to the user equipment; and transmit the handover policy to a session management functional entity, so that the session management functional entity configures the handover policy for another network entity

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone:

FIG. 6 is a schematic diagram showing a transmission interval of data packets and interrupt time due to handover according to some embodiments.

FIG. 7 is a flowchart of a network handover processing method according to some embodiments.

FIG. 8 is a flowchart of a network handover processing method according to some embodiments.

DESCRIPTION OF EMBODIMENTS

Figures 1, 2:
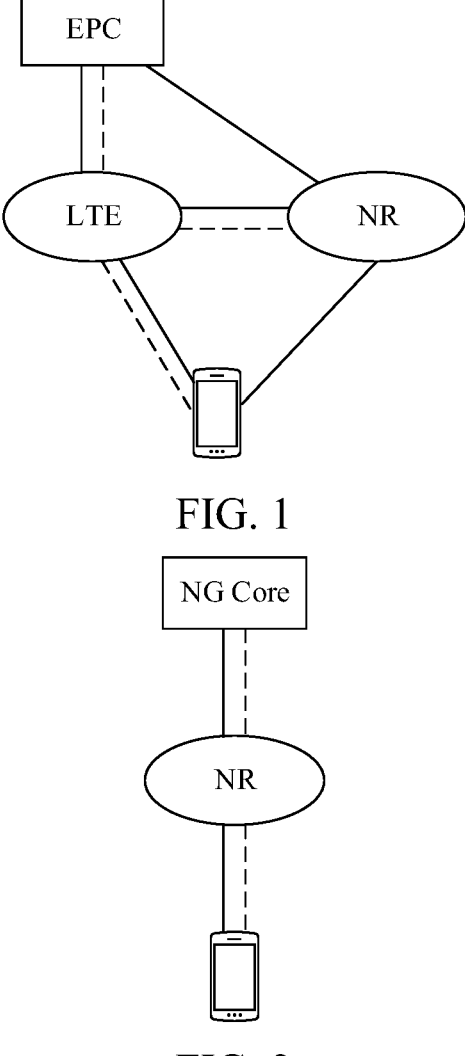
FIG. 1 is a schematic diagram of a networking mode for a 5G system according to some embodiments.
FIG. 2 is a schematic diagram of a networking mode for a 5G system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In addition, the features, structures or characteristics described herein may be combined in one or more embodiments in any appropriate manner. In the following descriptions, a variety of specific details are provided to give a comprehensive understanding of the present disclosure. However, a person skilled in the art is to be aware that, the technical solutions may be implemented without using all particular details, one or more of the particular details may be omitted, or another method, unit, apparatus, or operation may be used.

Some embodiments provide a network handover processing method, executed by a policy control functional entity, the method comprising: receiving traffic stream feature information from an application side, the traffic stream feature information indicating features of service data packets transmitted between the application side and user equipment; generating, based on the traffic stream feature information, a handover policy, the handover policy being a policy to be followed during a handover of an access network entity connected to the user equipment; and sending the handover policy to a session management functional entity, so that the session management functional entity configures the handover policy to another network entity.

Some embodiments provide a network handover processing method, executed by a session management functional entity, the method comprising: receiving a handover policy from a policy control functional entity, the handover policy indicating a policy to be followed during a handover of an access network entity connected to user equipment, the handover policy being generated by the policy control functional entity based on traffic stream feature information provided by an application side, and the traffic stream feature information indicating features of service data packets transmitted between the application side and the user equipment; and configuring the handover policy to another network entity, so that the another network entity performs a handover operation based on the handover policy during a handover of the access network entity.

Some embodiments provide a network handover processing apparatus, comprising: a first receiving unit, configured to receive traffic stream feature information from an application side, the traffic stream feature information indicating features of service data packets transmitted between the application side and user equipment; a generation unit, configured to generate, based on the traffic stream feature information, a handover policy, the handover policy being a policy to be followed during a handover of an access network entity connected to the user equipment; and a transmitting unit, configured to send the handover policy to a session management functional entity, so that the session management functional entity configures the handover policy to another network entity.

Some embodiments provide a network handover processing apparatus, comprising: a second receiving unit, configured to receive a handover policy from a policy control functional entity, the handover policy indicating a policy to be followed during a handover of an access network entity connected to user equipment, the handover policy being generated by the policy control functional entity based on traffic stream feature information provided by an application side, and the traffic stream feature information indicating features of service data packets transmitted between the application side and the user equipment; and a processing unit, configured to configure the handover policy to another network entity, so that the another network entity performs a handover operation based on the handover policy during a handover of the access network entity.

Some embodiments provide a non-volatile computer-readable storage medium, storing a computer program, the computer program, when executed by a processor, implementing the network handover processing method.

Some embodiments provide an electronic device, comprising: one or more processors; and a storage apparatus, configured to store one or more programs, the one or more programs, when executed by the one or more processors, causing the electronic device to implement the network handover processing method Some embodiments provide a computer program product or computer program, the computer program product or computer program comprising a computer instruction stored in a computer-readable storage medium. A processor of a computer device reads the computer instruction from the computer-readable storage medium, and executes the computer instruction to enable the computer device to implement the network handover processing method.

In the technical solutions according to some embodiments, a policy control functional entity receives traffic stream feature information from an application side, then generates, based on the traffic stream feature information, a handover policy to be followed during a handover of an access network entity connected to the user equipment, and sends the handover policy to a session management functional entity, so that the session management functional entity configures the handover policy to another network entity. In this way, the handover policy to be followed during a handover of the access network entity is flexibly adjusted, so as to ensure that the handover policy matches actual traffic stream feature information, and avoid high handover costs and high network resource consumption.

It is to be understood that, the foregoing general descriptions and the following detailed descriptions are merely for illustration and explanation purposes and are not intended to limit thereto.

The block diagrams shown in the accompanying drawings are merely function entities and do not necessarily correspond to physically independent entities. That is, the function entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

In the following descriptions, related "some embodiments" describe a subset of all possible embodiments. However, it may be understood that the "some embodiments" may be the same subset or different subsets of all the possible embodiments, and may be combined with each other without conflict.

"A plurality of" as used herein means two or more. "And/or" describes an association relationship between associated objects, and indicates that three relationships may exist. For example, A and/or B may indicate the following three cases: Only A exists, both A and B exist, and only B exits. Similarly, as used in this specification, the phrase "at least one of A and B" includes within its scope "only A", "only B" and "both A and B". The character "/" generally indicates an "or" relationship between the associated objects.

In a 5G system, two networking modes as shown in FIG. 1 and FIG. 2 are provided. The networking mode shown in FIG. 1 is non-standalone (NSA), where dotted lines indicate a control plane, that is, a channel used for sending signaling required to manage and schedule resources; and solid lines indicate a user plane, that is, a channel used for sending specific data. NSA uses a dual connection mode, with a 5G new radio (NR) control plane anchored to 4G long term evolution (LTE), and requires a 4G evolved packet core (EPC).

The networking mode shown in FIG. 2 is standalone (SA). As a complete and independent 5G network without relying on 4G, 5G NR is directly connected to a 5G core (NR Core).

Figures 3, 4:
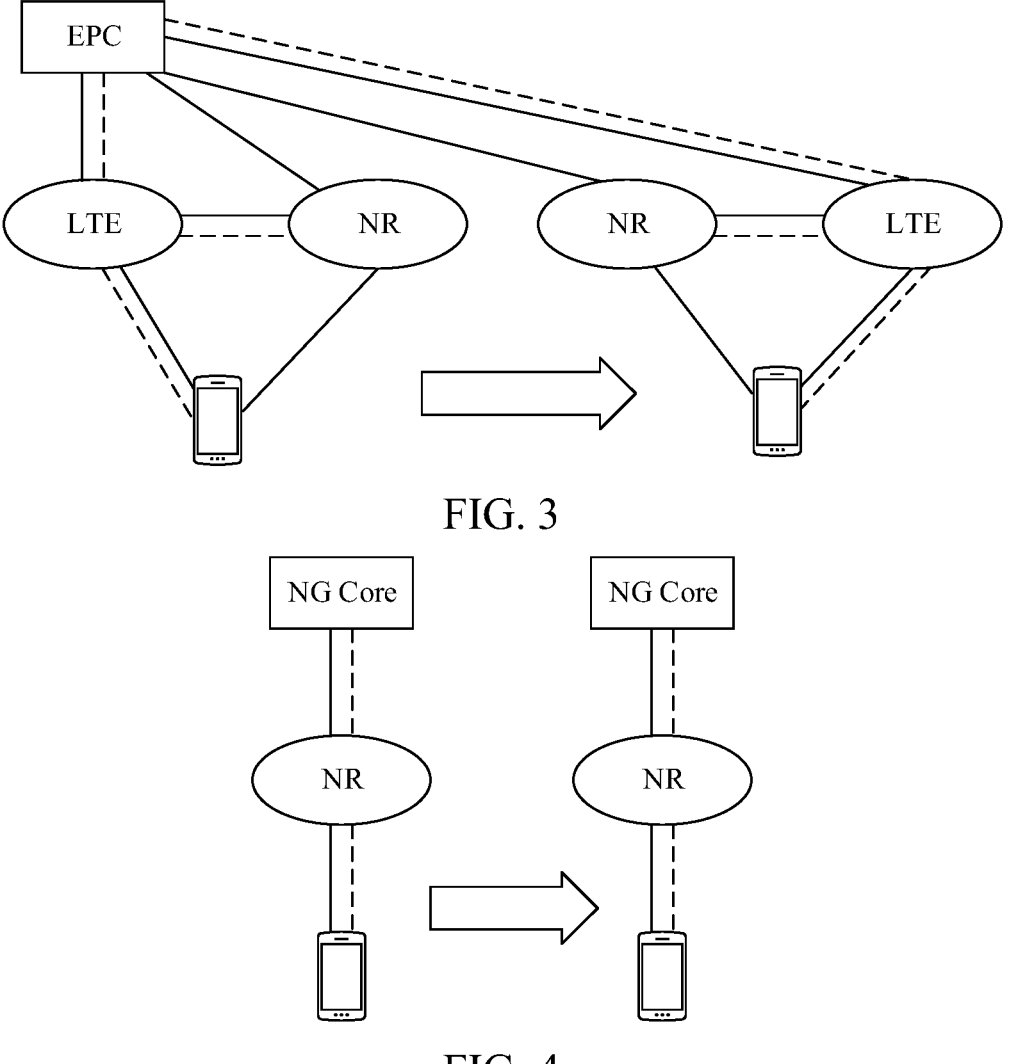
FIG. 3 is a schematic diagram of a network handover procedure for a 5G system according to some embodiments.
FIG. 4 is a schematic diagram of a network handover procedure for a 5G system according to some embodiments.

A handover mechanism is further introduced in the 5G system to implement a handover between access network devices connected to UE. For the NSA mode, the handover is more complicated because 5G and 4G are interconnected at an access network level. As 5G NR is anchored to 4G LTE, several operations are required to complete an NR-to-NR handover if an LTE anchor changes. As shown in FIG. 3, in an NR-to-NR handover, a source subcarrier needs to be deleted first to release source NR resources, then an LTE-to-LTE handover is performed, and a target subcarrier is added to reallocate target NR resources. The whole process is complicated and has a high delay.

For the SA mode, as shown in FIG. 4, an NR-to-NR handover is independent of an LTE handover, which is relatively simple with a low delay.

Figure 5:
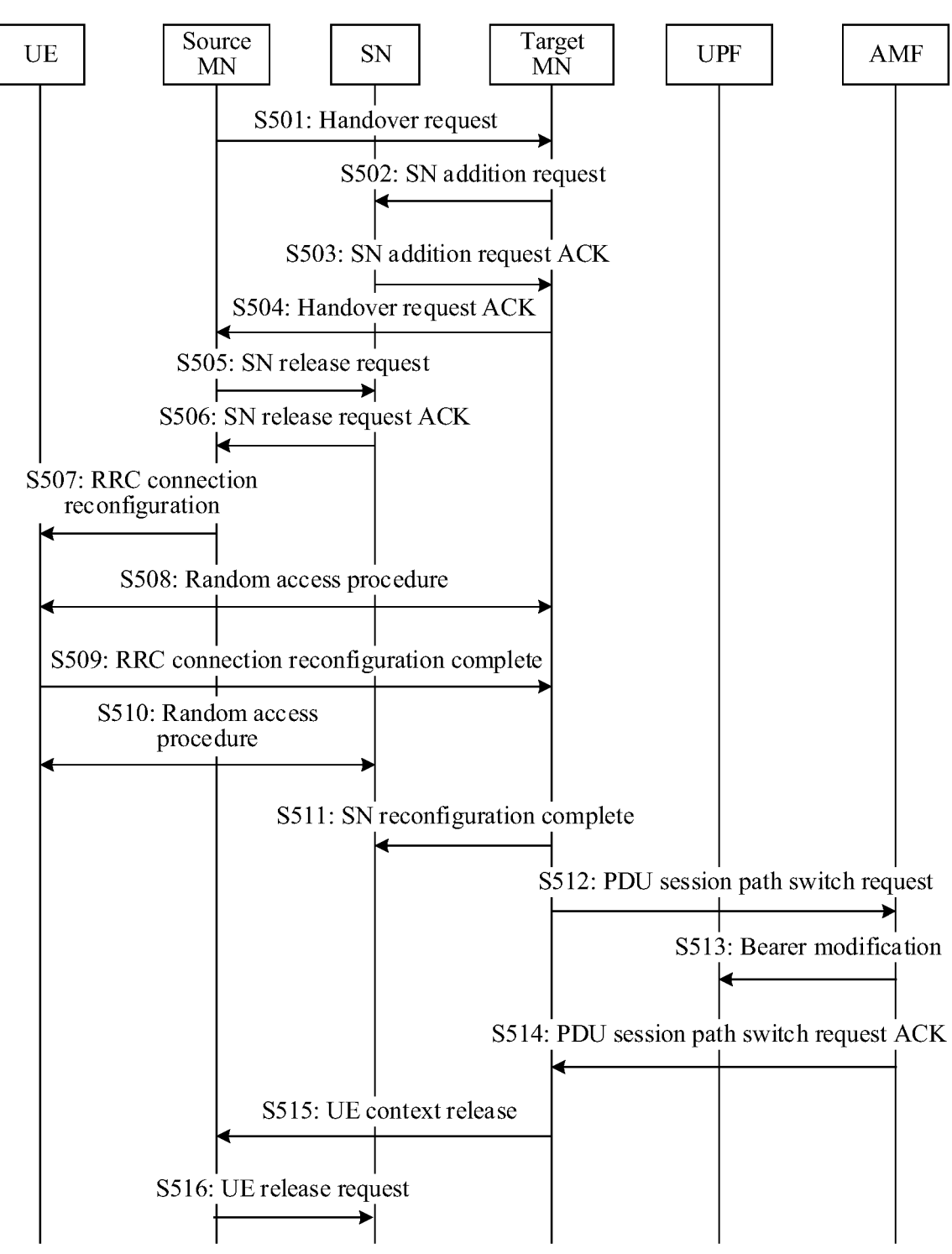
FIG. 5 is a schematic diagram of a network handover procedure according to some embodiments.

In addition, to guarantee handover performance, a handover mechanism based on a dual connection architecture is further proposed in related art, that is, an access network device uses an architecture including a master node (MN) and a secondary node (SN). The SN can remain unchanged during a handover of the MN, thereby ensuring that data can be continuously forwarded through the SN. A specific process is shown in FIG. 5, and includes the following operations:

S501: A source MN sends a handover request to a target MN.

S502: The target MN sends an SN addition request to an SN.

S503: The SN feeds back an SN addition request ACK to the target MN.

S504: The target MN sends a handover request ACK to the source MN.

S505: The source MN sends an SN release request to the SN.

S506: The SN sends an SN release request ACK to the source MN.

S507: The source MN sends a radio resource control (RRC) connection reconfiguration message to UE.

S508: The UE initiates a random access procedure to the target MN.

S509: An RRC connection reconfiguration procedure between the UE and the target MN is completed (i.e., RRC connection reconfiguration complete).

S510: The UE initiates a random access procedure to the SN.

S511: The target MN sends a reconfiguration complete message (SN reconfiguration complete) to the SN.

S512: The target MN sends a protocol data unit (PDU) session path switch request to an access and mobility management function (AMF).

S513: The AMF modifies a user plane function (UPF) of a bearer PDU session, that is, a bearer modification procedure.

S514: The AMF sends a PDU session path switch request ACK to the target MN.

S515: The target MN sends a UE context release message to the source MN.

S516: The source MN initiates a UE release request to the SN.

In the handover process shown in FIG. 5, handover performance is guaranteed by configuring a dual connection mode, which is expensive and requires more network resources. In some other technical solutions, to guarantee handover performance, it is also provided to ensure lossless data transmission by using data caching and data forwarding mechanisms during a handover. The data forwarding mechanism includes data forwarding, in which a pre-handover base station forwards cached data to a post-handover base station, so as to ensure that data is not lost.

Nowadays, real-time multimedia services and services such as extended reality (XR) and augmented reality (AR) are rapidly developing and popularizing. In addition, real-time multimedia services and services such as XR require high data transmission rates and a large amount of cache and data. If caching and data forwarding mechanisms are used indiscriminately for such services, real-time data transmission without loss and disorder will require extremely high costs of network resources.

However, data packets are transmitted with a transmission interval. Therefore, handover performance will not be affected as long as the handover occurs within the transmission time and handover delay does not exceed the transmission interval. In this case, the pursuit of extremely low handover delay does not help to improve user experience at an application layer, and unnecessarily wastes network resources.

As shown in FIG. 6, a transmission interval (i.e., an arrival interval) of data packets is T1, and interrupt time due to handover is T2. As long as the handover occurs within the transmission interval of the data packets and T2<T1, service side characteristics will not be affected. Generally, if the handover interrupt delay is reduced to a shorter time than T2, excessive additional resources are occupied and the cost increases.

Based on this, the technical solution in some embodiments provides a new network handover processing solution, which can flexibly adjust, based on traffic stream feature information, a handover policy to be followed during a handover of an access network entity, so as to ensure that the handover policy matches actual traffic stream feature information, thereby avoiding high handover costs and avoiding occupying excessive network resources.

FIG. 7 is a flowchart of a network handover processing method according to some embodiments, the network handover processing method can be executed by a policy control function (PCF) entity. Referring to FIG. 7, the network handover processing method may include at least operation S710 to operation S730. A detailed description is as follows:

In S710, traffic stream feature information provided by an application side is received, the traffic stream feature information is used for indicating features of service data packets transmitted between the application side and user equipment.

In some embodiments, the application side may be an application function (AF) or an application server (AS). If mutual trust is established between the application side and the PCF through negotiation, the application side can send traffic stream feature information directly to the PCF, that is, the PCF can receive the traffic stream feature information directly sent by the application side. If mutual trust is not established between the application side and the PCF, the application side can send traffic stream feature information to a network exposure function (NEF) entity, and then the NEF forwards the traffic stream feature information to the PCF, that is, the PCF can receive the traffic stream feature information forwarded by the NEF from the application side.

In some embodiments, the user equipment may be a smartphone, a tablet computer, a notebook computer, a desktop computer, a smart speaker, a smart watch, a smart home, a vehicle terminal, or the like, but is not limited thereto.

In some embodiments, the traffic stream feature information includes at least one of: a transmission interval of the service data packets, a packet size of the service data packets, and an importance of the service data packets.

In some embodiments, the transmission interval of the service data packets is a sending time interval between two adjacent service data packets, or a receiving time interval between two adjacent service data packets. For example, if the service data packets are sent periodically, the period is the transmission interval of the service data packets.

The packet size of the service data packets is a data size of the service data packets. The importance of the service data packets can be reflected, for example, by the type of the service data packets, for example, the importance of a key frame (e.g., an I frame) is higher than that of a non-key frame (e.g., a P frame).

Referring to FIG. 7, in S720, a handover policy is generated based on the traffic stream feature information, the handover policy is a policy to be followed during a handover of an access network entity connected to the user equipment.

In some embodiments, for a 5G network, the access network entity may be an NR base station; and for a 4G network, the access network entity may be an LTE base station.

In some embodiments, the handover policy includes at least one of: a flag indicating whether to perform data forwarding during a handover; a tolerable handover delay during a handover; a context transfer requirement of a source and a destination during a handover, the context transfer requirement including any one of full configuration, partial configuration, and delta configuration; and a flag indicating whether the user equipment executes a make before break policy or a break before make policy during a handover.

In some embodiments, whether to perform data forwarding means whether data forwarding is required. For example, even if data forwarding is performed due to requirements of real-time services, the operation is not helpful for the real-time services, and causes a waste of network resources. In this case, data forwarding is not required.

The tolerable handover delay during a handover is used for indicating the maximum delay required during the handover. In some embodiments, the maximum delay during the handover is to be less than or equal to the tolerable handover delay. The context transfer requirement of the source and the destination during a handover may include any one of full configuration, partial configuration, and delta configuration.

For make before break and break before make, if a make before break policy is executed, smoothness of the handover can be guaranteed, but the UE is required to have the ability to connect to a plurality of access network devices at the same time. The make before break and break before make policies can be based on a dual connection architecture (that is, an access network device uses an architecture including an MN and an SN) or a non-dual connection architecture. In addition, the technical solution in some embodiments applies not only to a dual connection architecture, but also to a non-dual connection architecture.

In some embodiments, if the traffic stream feature information includes a transmission interval of service data packets, a handover policy including a tolerable handover delay during a handover can be generated based on the transmission interval of the service data packets. As shown in FIG. 6, the handover performance can be guaranteed when the tolerable handover delay during a handover is less than or equal to the transmission interval of the service data packets. Therefore, a handover policy including the tolerable handover delay during a handover can be generated based on the transmission interval of the service data packets. In some embodiments, the tolerable handover delay during a handover is less than or equal to the transmission interval of the service data packets.

In some embodiments, if the traffic stream feature information includes at least importance of service data packets, a handover policy including at least a flag indicating whether to perform data forwarding during a handover can be generated based on the importance of the service data packets. In some embodiments, if the service data packets are important, the generated handover policy may be that data forwarding is performed; if the service data packets are unimportant, to reduce wastes of network resources, the generated handover policy may be that data forwarding is not performed; and if one part of the service data packets are important, and the other part of the service data packets are unimportant, the generated handover policy may also be that data forwarding is performed on some service data packets (important service data packets), and data forwarding is not performed on the other service data packets (unimportant service data packets).

In some embodiments, if the generated handover policy includes a flag indicating whether the user equipment executes a make before break policy or a break before make policy during a handover, it is required to obtain network connection capability information of the user equipment before the handover policy is generated, and the network connection capability information is used for indicating a quantity of access network entities to which the user equipment can be connected at the same time. If the network connection capability information of the user equipment indicates that the user equipment can connect to a plurality of access network entities at the same time, the generated handover policy may be that the user equipment executes the make before break policy; and if the network connection capability information of the user equipment indicates that the user equipment cannot connect to a plurality of access network entities at the same time, the generated handover policy is that the user equipment executes the break before make policy during a handover.

In some embodiments, when a handover policy is generated, a handover policy configured in another network entity can also be obtained, and then a handover policy to be followed during a handover of an access network entity is generated based on traffic stream feature information and the handover policy configured in the another network entity. For example, it is determined, based on the traffic stream feature information and the handover policy configured in the another network entity, whether to update the handover policy configured in the another network entity, and a new handover policy is generated if an update is required.

Still referring to FIG. 7, in S730, the generated handover policy is sent to a session management functional entity, so that the session management functional entity configures the handover policy to another network entity.

In some embodiments, the another network entity may include the AMF, an access network entity (e.g., base station equipment), user equipment, or the like. The PCF can send the generated handover policy to a session management function (SMF), the SMF then sends the generated handover policy to the AMF, and the AMF configures the handover policy to the access network entity and the user equipment. The handover policy in some embodiments may include a handover policy for each network entity or a handover policy for all network entities.

FIG. 8 is a flowchart of a network handover processing method according to some embodiments, the network handover processing method can be executed by a session management functional entity. Referring to FIG. 8, the network handover processing method may include at least operation S810 to operation S820. A detailed description is as follows:

In operation S810, a handover policy sent by a policy control functional entity is received, the handover policy indicates a policy to be followed during a handover of an access network entity connected to user equipment, the handover policy is generated by the policy control functional entity based on traffic stream feature information provided by an application side, and the traffic stream feature information is used for indicating features of service data packets transmitted between the application side and the user equipment.

In some embodiments, the handover policy includes at least one of: a flag indicating whether to perform data forwarding during a handover; a tolerable handover delay during a handover; a context transfer requirement of a source and a destination during a handover, the context transfer requirement including any one of full configuration, partial configuration, and delta configuration; and a flag indicating whether the user equipment executes a make before break policy or a break before make policy during a handover.

In some embodiments, the traffic stream feature information includes at least one of: a transmission interval of the service data packets, a packet size of the service data packets, and importance of the service data packets.

For detailed descriptions of the handover policy and the traffic stream feature information, reference may be made to the technical solutions in the foregoing embodiments. Details are not described herein again.

In operation S820, the handover policy is configured to another network entity, so that the another network entity performs a handover operation based on the handover policy during a handover of the access network entity.

In some embodiments, the session management functional entity can configure the handover policy to an access and mobility management functional entity and the user equipment, then the access and mobility management functional entity updates, based on the handover policy, a handover policy for the user equipment and the service data packets, and the access and mobility management functional entity configures the handover policy to connected access network entities (for example, access network entities before and after the handover).

The technical solution in some embodiments can flexibly adjust, based on traffic stream feature information, a handover policy to be followed during a handover of an access network entity, so as to ensure that the handover policy matches actual traffic stream feature information, thereby avoiding high handover costs and high network resource consumption.

Figure 9:
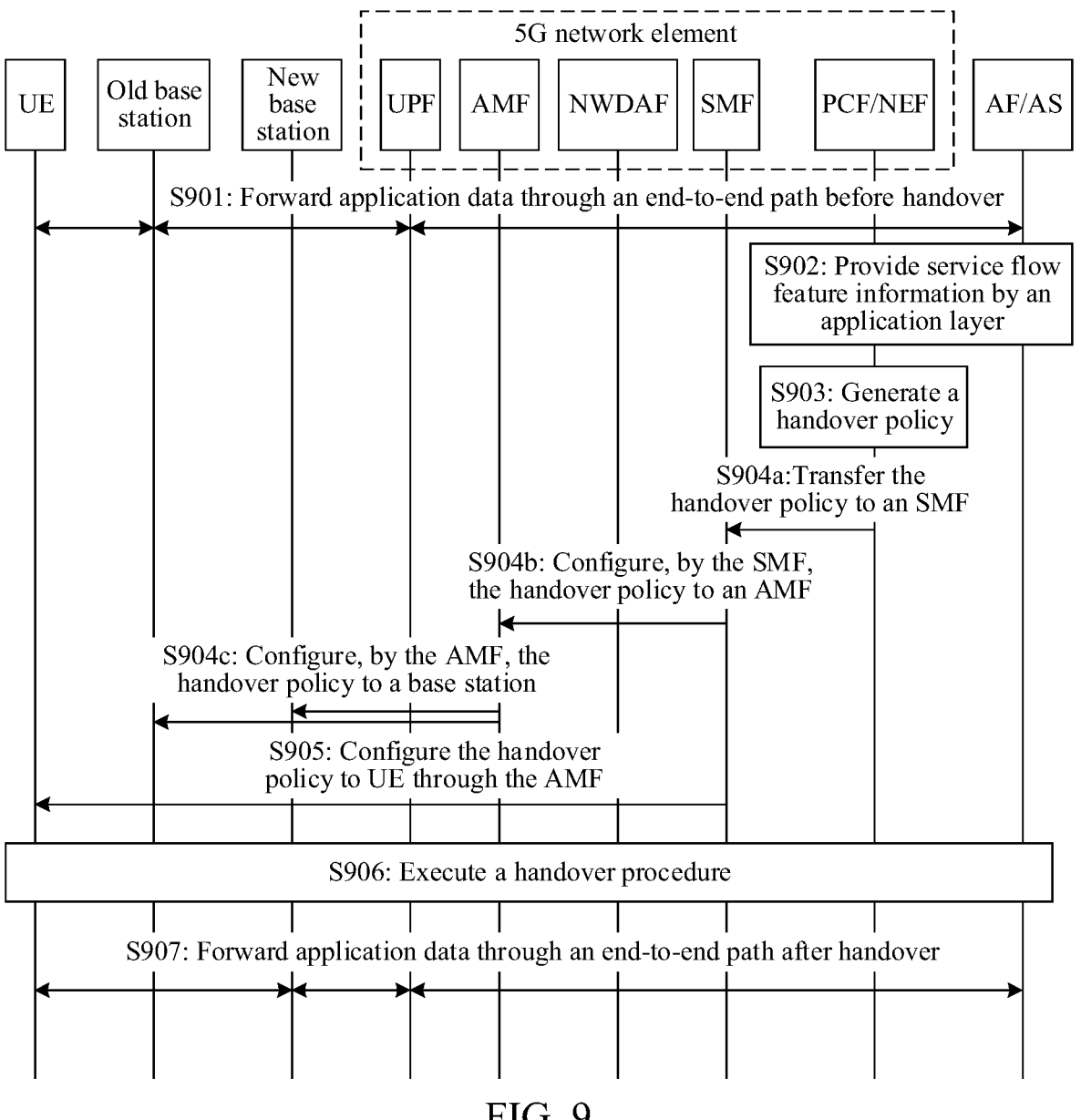
FIG. 9 is a flowchart of a network handover processing method according to some embodiments.

In some embodiments, considering wide bandwidth for multimedia services and services such as XR and AR, caching or data forwarding requires a large amount of resources. Therefore, through interaction between an application side and a network side, traffic stream feature information such as packet interval and other parameters is obtained and provided to a control plane network element to form a corresponding handover policy. Using a 5G network as an example, the implementation details of the technical solution are described in detail with reference to FIG. 9, and include the following operations:

S901: Application data is forwarded through a pre-handover end-to-end path. In some embodiments, the UE is connected to the UPF through an old base station, and then is connected to an application server through the UPF. In the embodiment shown in FIG. 9, the AF and the AS are drawn together. The AF and the AS are a control plane network element and a user plane network element, respectively, and can be deployed separately.

S902: Traffic stream feature information is obtained through interaction between the application side and the network side.

In some embodiments, if mutual trust is established between the AF/AS and the 5G core (5GC) through negotiation, the AF/AS can send the traffic stream feature information directly to a 5GC network element such as the PCF.

If the AF/AS and the 5GC are not trusted entities, the AF/AS can provide the traffic stream feature information to the NEF, a 5GC network element, and the NEF then forwards the traffic stream feature information to the PCF.

In some embodiments, the traffic stream feature information includes, but is not limited to: an arrival interval, a packet size feature, importance, and the like of periodic service data flow.

S903: The PCF generates, based on the obtained traffic stream feature information and information from other 5GC network elements, a corresponding handover policy.

In some embodiments, the information from other 5GC network elements includes, but is not limited to, information on UE-specific handover policies that have been configured on network elements such as the SMF and the AMF.

In some embodiments, the handover policy includes at least one of: a flag indicating whether to perform data forwarding during a handover; a tolerable handover delay during a handover; a context transfer requirement of a source and a destination during a handover, the context transfer requirement including any one of full configuration, partial configuration, and delta configuration; and a flag indicating whether the user equipment executes a make before break policy or a break before make policy during a handover.

In some embodiments, whether to perform data forwarding means whether data forwarding processing is required. For example, even if data forwarding is performed due to requirements of real-time services, the operation is not helpful for the real-time services, and causes a waste of network resources. In this case, data forwarding is not required.

The tolerable handover delay during a handover is used for indicating the maximum delay required during the handover. The maximum delay during the handover may be less than or equal to the tolerable handover delay. The context transfer requirement of the source and the destination during a handover may include full configuration, partial configuration, and delta configuration.

For make before break and break before make, if a make before break policy is executed, smoothness of the handover can be guaranteed, but the UE is required to have the ability to connect to a plurality of access network devices at the same time.

In some embodiments, if the traffic stream feature information includes a transmission interval of service data packets, a handover policy including a tolerable handover delay during a handover can be generated based on the transmission interval of the service data packets. As shown in FIG. 6, the handover performance can be guaranteed when the tolerable handover delay during a handover is less than or equal to the transmission interval of the service data packets. Therefore, a handover policy including the tolerable handover delay during a handover can be generated based on the transmission interval of the service data packets. In some embodiments, the tolerable handover delay during a handover is less than or equal to the transmission interval of the service data packets.

In some embodiments, if the traffic stream feature information includes at least importance of service data packets, a handover policy including at least a flag indicating whether to perform data forwarding during a handover can be generated based on the importance of the service data packets. If the service data packets are important, the generated handover policy may be that data forwarding is performed; if the service data packets are unimportant, to reduce wastes of network resources, the generated handover policy may be that data forwarding is not performed; and if one part of the service data packets are important, and the other part of the service data packets are unimportant, the generated handover policy may also be that data forwarding is performed on some service data packets (important service data packets), and data forwarding is not performed on the other service data packets (unimportant service data packets).

In some embodiments, when a handover policy is generated, it is determined, based on the traffic stream feature information and the handover policy configured in the another network entity, whether to update the handover policy configured in the another network entity, and a new handover policy is generated if an update is required.

S904: The generated handover policy is configured from the PCF to the AMF and base stations.

In operation S904a, the PCF configures the handover policy to the SMF; in operation S904b, the SMF configures the handover policy to the AMF, and after the configuration, the handover policy in the AMF needs to be updated for the specific UE and the specific service; and in operation S904c, the AMF configures the handover policy to base stations (including an old base station and a new base station), context information of gNB will be configured or updated in this operation, thus affecting the handover policy for the UE.

S905: The generated handover policy for the specific UE is configured to the UE through the AMF. The handover policy configured on the UE will affect a corresponding caching and data forwarding policy.

S906: A handover procedure is executed based on the configured policy. Configuration of the handover policy will be updated in the handover procedure, that is, whether there is data caching and data forwarding, whether lossless handover is required, and so on.

S907: Application data is forwarded through an end-to-end path after handover. The UE is connected to the UPF through a new base station, and then is connected to an application server through the UPF.

The technical solution in some embodiments can resolve the general problem of excessive costs of network resources due to a large amount of cached and forwarded data in real-time multimedia, XR and other services, and can reduce costs of data caching and forwarding operations required for lossless handover.

The following describes apparatus embodiments, and the apparatus embodiments may be used for performing the network handover processing method. For details not disclosed in the apparatus embodiments, reference may be made to the foregoing network handover processing method embodiments.

Figure 10:
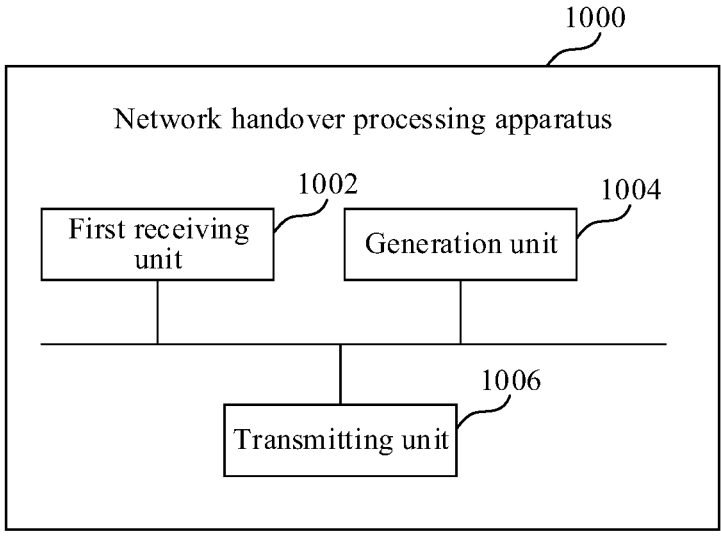
FIG. 10 is a block diagram of a network handover processing apparatus according to some embodiments.

FIG. 10 is a block diagram of a network handover processing apparatus according to some embodiments, the network handover processing apparatus may be disposed in a policy control functional entity.

In some embodiments, the network handover processing apparatus includes: a first receiving unit 1002, a generation unit 1004, and a transmitting unit 1006, among them, the first receiving unit 1002 is configured to receive traffic stream feature information provided by an application side, the traffic stream feature information is used for indicating features of service data packets transmitted between the application side and user equipment; the generation unit 1004, also referred to as generating unit, is configured to generate, based on the traffic stream feature information, a handover policy, the handover policy is a policy to be followed during a handover of an access network entity connected to the user equipment; and the transmitting unit 1006 is configured to send the handover policy to a session management functional entity, so that the session management functional entity configures the handover policy to another network entity.

In some embodiments, the first receiving unit 1002 is configured to: receive the traffic stream feature information forwarded by a network exposure functional entity from the application side; or receive the traffic stream feature information directly sent by the application side.

In some embodiments, the handover policy includes at least one of:

a flag indicating whether to perform data forwarding during a handover;

a tolerable handover delay during a handover;

a context transfer requirement of a source and a destination during a handover, the context transfer requirement including any one of full configuration, partial configuration, and delta configuration; and a flag indicating whether the user equipment executes a make before break policy or a break before make policy during a handover.

In some embodiments, the traffic stream feature information includes at least one of: a transmission interval of the service data packets, a packet size of the service data packets, and importance of the service data packets.

In some embodiments, the traffic stream feature information includes at least a transmission interval of the service data packets. The generation unit 1004 is configured to: generate, based on a transmission interval of the service data packets, a handover policy including at least a tolerable handover delay during a handover.

In some embodiments, the tolerable handover delay during a handover is less than or equal to the transmission interval of the service data packets.

In some embodiments, the traffic stream feature information includes at least importance of the service data packets. The generation unit 1004 is configured to: generate, based on the importance of the service data packets, a handover policy including at least a flag indicating whether to perform data forwarding during a handover.

In some embodiments, the handover policy includes a flag indicating whether the user equipment executes a make before break policy or a break before make policy during a handover. The generation unit 1004 obtains network connection capability information of the user equipment before generating a handover policy to be followed during a handover of an access network entity connected to the user equipment, the network connection capability information is used for indicating a quantity of access network entities to which the user equipment can be connected at the same time.

In some embodiments, the generation unit 1004 is configured to: obtain a handover policy configured in the another network entity; and generate, based on the traffic stream feature information and the handover policy configured in the another network entity, the handover policy.

Figure 11:
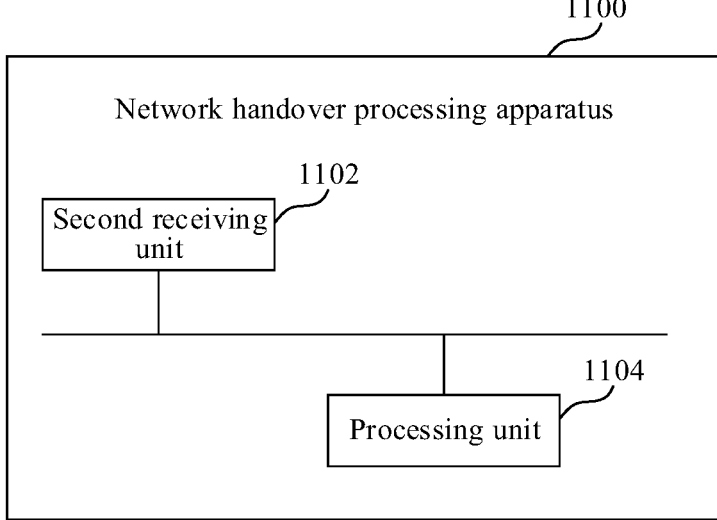
FIG. 11 is a block diagram of a network handover processing apparatus according to some embodiments.

FIG. 11 is a block diagram of a network handover processing apparatus according to some embodiments, the network handover processing apparatus may be disposed in a session management functional entity.

In some embodiments, the network handover processing apparatus includes: a second receiving unit 1102 and a processing unit 1104, the second receiving unit 1102 is configured to receive a handover policy sent by a policy control functional entity, the handover policy indicates a policy to be followed during a handover of an access network entity connected to user equipment, the handover policy is generated by the policy control functional entity based on traffic stream feature information provided by an application side, and the traffic stream feature information is used for indicating features of service data packets transmitted between the application side and the user equipment; and the processing unit 1104 is configured to configure the handover policy to another network entity, so that the another network entity performs a handover operation based on the handover policy during a handover of the access network entity.

In some embodiments, the processing unit 1104 is configured to: configure the handover policy to an access and mobility management functional entity and the user equipment, so as to instruct the access and mobility management functional entity to update, based on the handover policy, a handover policy for the user equipment and the service data packets, and instruct the access and mobility management functional entity to configure the handover policy to connected access network entities.

Figure 12:
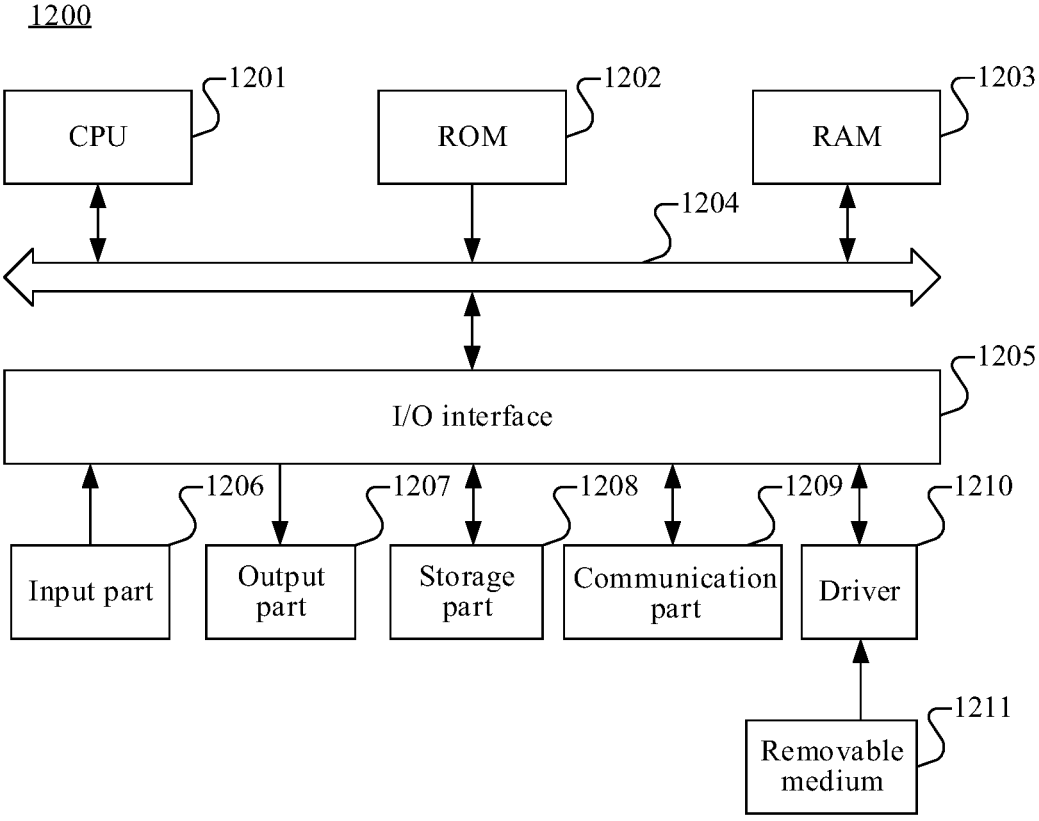
FIG. 12 is a schematic diagram of a structure of a computer system adapted to implement an electronic device according to some embodiments.

FIG. 12 is a schematic diagram of a structure of a computer system adapted to implement an electronic device according to some embodiments.

A computer system 1200 of the electronic device shown in FIG. 12 is merely an example, and does not constitute any limitation on functions and use ranges of embodiments of the disclosure.

As shown in FIG. 12, the computer system 1200 includes a central processing unit (CPU) 1201, which may perform various suitable actions and processing based on a program stored in a read-only memory (ROM) 1202 or a program loaded from a storage part 1208 into a random access memory (RAM) 1203, for example, perform the method described in the foregoing embodiments. The RAM 1203 further stores various programs and data required for system operations. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse, or the like; an output part 1207 including a cathode ray tube (CRT), a liquid crystal display (LCD), a speaker, or the like; a storage part 1208 including a hard disk, or the like; and a communication part 1209 including a network interface card such as a local area network (LAN) card or a modem. The communication part 1209 performs communication processing by using a network such as the Internet. A driver 1210 is also connected to the I/O interface 1205 as required. A removable medium 1211, such as a magnetic disk, an optical disc, a magneto-optical disk, or a semiconductor memory, is installed on the driver 1210 as required, so that a computer program read from the removable medium is installed into the storage part 1208 as required.

According to some embodiments, the processes described in the following by referring to the flowcharts may be implemented as computer software programs. Some embodiments include a computer program product. The computer program product includes a computer program stored in a computer-readable medium. The computer program includes a computer program used for performing a method shown in the flowchart. In such an embodiment, the computer program may be downloaded and installed from a network through the communication part 1209, and/or installed from the removable medium 1211. When the computer program is executed by the CPU 1201, the various functions defined in the system are executed.

The computer-readable medium shown in some embodiments may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or device, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In some embodiments, the computer-readable storage medium may be any tangible medium containing or storing a program, and the program may be used by or used in combination with an instruction execution system, an apparatus, or a device. The computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium can also be any computer-readable medium other than a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wire, or the like, or any appropriate combination thereof.

The flowcharts and block diagrams in the accompanying drawings illustrate possible system architectures, functions and operations that may be implemented by a system, a method, and a computer program product according to various embodiments. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It is also important that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described, in some embodiments, may be implemented in a software manner, or may be implemented in a hardware manner, and the unit described can also be set in a processor. Furthermore, names of the units do not constitute a limitation on the units in a specific case.

Some embodiments further provide a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. In some embodiments, the features and functions of two or more modules or units described above may be implemented in one module or unit. In some embodiments, the features and functions of one module or unit described above may be further divided to be embodied by a plurality of modules or units.

According to the foregoing descriptions, a person skilled in the art may readily understand that the foregoing described herein may be implemented by using software, or may be implemented by combining software and necessary hardware. Therefore, the technical solutions of the embodiments may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like).

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A network handover processing method, performed by a policy control device, the network handover processing method comprising:

receiving, by a policy control function (PCF) of the policy control device, traffic stream feature information from an application side that is one of an application function (AF) and an application server (AS), the traffic stream feature information indicating features of service data packets transmitted between the application side and user equipment;

generating, based on the traffic stream feature information and information from at least one other network element, a handover policy, the handover policy being a policy to be followed during a handover of an access network entity connected to the user equipment; and transmitting the handover policy to a session management functional entity, so that the session management functional entity configures the handover policy for another network entity.

2. The network handover processing method according to claim 1, wherein the handover policy comprises at least one of:

a flag indicating whether to perform data forwarding during the handover;

a tolerable handover delay during the handover;

a context transfer requirement of a source and a destination during the handover, the context transfer requirement comprising one of a full configuration, a partial configuration, and a delta configuration; and a flag indicating whether the user equipment executes a make before break policy or a break before make policy during the handover.

3. The network handover processing method according to claim 1, wherein the traffic stream feature information comprises at least one of: a transmission interval of the service data packets, a packet size of the service data packets, and an importance of the service data packets.

4. The network handover processing method according to claim 1, wherein the traffic stream feature information comprises a transmission interval of the service data packets; and wherein the generating comprises:

generating, based on the transmission interval of the service data packets, the handover policy comprising at least a tolerable handover delay during the handover.

5. The network handover processing method according to claim 4, wherein the tolerable handover delay is less than or equal to the transmission interval of the service data packets.

6. The network handover processing method according to claim 1, wherein the traffic stream feature information comprises an importance of the service data packets; and wherein the generating comprises:

generating, based on the importance of the service data packets, the handover policy comprising at least a flag indicating whether to perform data forwarding during the handover.

7. The network handover processing method according to claim 1, wherein the handover policy comprises a flag indicating whether the user equipment executes a make before break policy or a break before make policy during the handover; and wherein before the generating, the network handover processing method further comprises:

obtaining network connection capability information of the user equipment, the network connection capability information indicating a quantity of access network entities to which the user equipment can be connected at a same time.

8. The network handover processing method according to claim 1, further comprising:

obtaining another handover policy configured in the another network entity, wherein the information from the at least one other network element includes the another handover policy.

9. A network handover processing apparatus, comprising:

at least one memory configured to store program code; and at least one processor configured to read the program code and operate as instructed by the program code, the program code comprising:

first receiving code configured to cause at least one of the at least one processor to receive, by a policy control function (PCF), traffic stream feature information from an application side that is one of an application function (AF) and an application server (AS), the traffic stream feature information indicating features of service data packets transmitted between the application side and user equipment;

generating code configured to cause at least one of the at least one processor to generate, based on the traffic stream feature information and information from at least one other network element, a handover policy, the handover policy being a policy to be followed during a handover of an access network entity connected to the user equipment; and transmitting code configured to cause at least one of the at least one processor to transmit the handover policy to a session management functional entity, so that the session management functional entity configures the handover policy for another network entity.

10. The network handover processing apparatus according to claim 9, wherein the handover policy comprises at least one of:

a flag indicating whether to perform data forwarding during the handover;

a tolerable handover delay during the handover;

a context transfer requirement of a source and a destination during the handover, the context transfer requirement comprising one of a full configuration, a partial configuration, and a delta configuration; and a flag indicating whether the user equipment executes a make before break policy or a break before make policy during the handover.

11. The network handover processing apparatus according to claim 9, wherein the traffic stream feature information comprises at least one of: a transmission interval of the service data packets, a packet size of the service data packets, and an importance of the service data packets.

12. The network handover processing apparatus according to claim 9, wherein the traffic stream feature information comprises a transmission interval of the service data packets; and wherein the generating code is further configured to cause at least one of the at least one processor to:

generate, based on the transmission interval of the service data packets, the handover policy comprising at least a tolerable handover delay during the handover.

13. The network handover processing apparatus according to claim 12, wherein the tolerable handover delay is less than or equal to the transmission interval of the service data packets.

14. The network handover processing apparatus according to claim 9, wherein the traffic stream feature information comprises an importance of the service data packets; and wherein the generating code is further configured to cause at least one of the at least one processor to:

generate, based on the importance of the service data packets, the handover policy comprising at least a flag indicating whether to perform data forwarding during the handover.

15. The network handover processing apparatus according to claim 9, wherein the handover policy comprises a flag indicating whether the user equipment executes a make before break policy or a break before make policy during the handover; and wherein the generating code is further configured to cause at least one of the at least one processor to:

obtain network connection capability information of the user equipment, the network connection capability information indicating a quantity of access network entities to which the user equipment can be connected at a same time.

16. The network handover processing apparatus according to claim 9, wherein the generating code is further configured to cause at least one of the at least one processor to:

obtaining another handover policy configured in the another network entity, wherein the information from the at least one other network element includes the another handover policy.

17. A non-transitory computer-readable storage medium storing computer code which, when executed by at least one processor, causes the at least one processor to at least:

receive, by a policy control function (PCF) of the policy control device, traffic stream feature information from an application side that is one of an application function (AF) and an application server (AS), the traffic stream feature information indicating features of service data packets transmitted between the application side and user equipment;

generate, based on the traffic stream feature information and information from at least one other network element, a handover policy, the handover policy being a policy to be followed during a handover of an access network entity connected to the user equipment; and transmit the handover policy to a session management functional entity, so that the session management functional entity configures the handover policy for another network entity.

18. The network handover processing method according to claim 1, wherein the traffic stream feature information comprises an importance of the service data packets.

19. The network handover processing method according to claim 1, wherein the handover policy comprises a flag indicating whether the user equipment executes a make before break policy or a break before make policy during the handover.

20. The network handover processing method according to claim 1, wherein the handover policy indicates whether the user equipment executes a make before break policy or a break before make policy during the handover.

* * * * *